(12) United States Patent
Morita et al.

(10) Patent No.: US 11,054,247 B2
(45) Date of Patent: Jul. 6, 2021

(54) PHOTODETECTION METHOD AND PHOTODETECTION APPARATUS

(71) Applicant: SONY CORPORATION, Tokyo (JP)

(72) Inventors: Hiroshi Morita, Kanagawa (JP); Kazuaki Toba, Kanagawa (JP); Masanari Yamamoto, Kanagawa (JP); Kenjiro Ueda, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/475,435

(22) PCT Filed: Jan. 15, 2018

(86) PCT No.: PCT/JP2018/000761
§ 371 (c)(1),
(2) Date: Jul. 2, 2019

(87) PCT Pub. No.: WO2018/131700
PCT Pub. Date: Jul. 19, 2018

(65) Prior Publication Data
US 2019/0339061 A1   Nov. 7, 2019

(30) Foreign Application Priority Data
Jan. 16, 2017   (JP) .............................. JP2017-005399

(51) Int. Cl.
*G01B 11/08*  (2006.01)
*G01B 11/24*  (2006.01)
*G01B 11/26*  (2006.01)

(52) U.S. Cl.
CPC .............. *G01B 11/08* (2013.01); *G01B 11/24* (2013.01); *G01B 11/26* (2013.01)

(58) Field of Classification Search
CPC .......... G01B 11/26; G01B 11/00; G01B 11/08; G01B 11/24; G01J 1/4257; G02B 21/24;
(Continued)

(56) References Cited

U.S. PATENT DOCUMENTS

| 4,710,193 A | * | 12/1987 | Volk ........................ A61F 2/164 |
| | | | 351/159.08 |
| 5,352,495 A | * | 10/1994 | Henderson ......... B23K 26/0734 |
| | | | 427/554 |

(Continued)

FOREIGN PATENT DOCUMENTS

| CN | 1595058 A | 3/2005 |
| CN | 1719195 A | 1/2006 |

(Continued)

OTHER PUBLICATIONS

International Search Report and Written Opinion of PCT Application No. PCT/JP2018/000761, dated Mar. 13, 2018, 08 pages of ISRWO.

(Continued)

*Primary Examiner* — Sang H Nguyen
(74) *Attorney, Agent, or Firm* — Chip Law Group

(57) ABSTRACT

An optical axis or a diameter of light of even a light beam having a non-uniform intensity distribution is stably obtained. An outer shape of a range of a light intensity having a specified ratio with respect to a total light intensity on a cross-section of a light beam is obtained. An approximate circle is obtained from this outer shape. For example, the approximate circle is calculated by using the least-squares method. An optical axis and/or a diameter of light of the light beam is obtained on the basis of this approximate circle.

10 Claims, 4 Drawing Sheets

(58) Field of Classification Search
CPC ...... G02B 21/367; G02B 21/16; G02B 21/06; H01S 5/02296; H01S 5/183; H01S 5/0683
See application file for complete search history.

(56) References Cited

U.S. PATENT DOCUMENTS

| | | | |
|---|---|---|---|
| 5,606,588 A | | 2/1997 | Umstadter et al. |
| 5,737,348 A | * | 4/1998 | Smith .................. H01S 5/02296 257/80 |
| 5,946,282 A | * | 8/1999 | Hirono ................... B82Y 10/00 369/112.02 |
| 6,563,567 B1 | * | 5/2003 | Komatsuda ......... G03F 7/70075 355/53 |
| 8,106,934 B2 | * | 1/2012 | Ishimi ................... B41J 2/4753 347/224 |
| 9,346,126 B2 | * | 5/2016 | Watanabe .......... B23K 26/0648 |
| 2004/0184500 A1 | * | 9/2004 | Kuwata ............... H01S 5/18394 372/46.01 |
| 2011/0194175 A1 | * | 8/2011 | Dougherty ........... G02B 26/105 359/386 |
| 2013/0020499 A1 | * | 1/2013 | Kameda ................. G02B 7/008 250/435 |
| 2014/0009944 A1 | * | 1/2014 | Fukuda ................... H01L 33/58 362/311.08 |
| 2015/0268040 A1 | * | 9/2015 | Izumi ..................... G01B 21/24 356/399 |
| 2016/0061419 A1 | * | 3/2016 | Gomi ...................... F21V 11/12 362/84 |
| 2016/0327802 A1 | * | 11/2016 | Bethel ................. G02B 27/0927 |
| 2018/0052232 A1 | * | 2/2018 | Ohtomo ................. G01B 11/14 |

FOREIGN PATENT DOCUMENTS

| | | |
|---|---|---|
| CN | 101219609 A | 7/2008 |
| CN | 101435700 A | 5/2009 |
| CN | 102589435 A | 7/2012 |
| CN | 104019757 A | 9/2014 |
| CN | 104554341 A | 4/2015 |
| DE | 10352719 A1 | 6/2005 |
| JP | 54-2175 A | 1/1979 |
| JP | 06-259783 A | 9/1994 |
| JP | 10-267753 A | 10/1998 |
| JP | 2008-020290 A | 1/2008 |
| JP | 2008-179135 A | 8/2008 |
| JP | 2010-127668 A | 6/2010 |
| JP | 2012-003528 A | 1/2012 |
| JP | 2012-069907 A | 4/2012 |
| JP | 2015-191132 A | 11/2015 |
| JP | 2018-028464 A | 2/2018 |
| TW | I522608 B | 2/2016 |

OTHER PUBLICATIONS

Essien, et al., "Beam Characterization of a Materials Processing CO2 Laser", Welding Journal, Feb. 29, 1996, 'pp. 47-54.

Office Action for CN Patent Application No. 201880006248.5 dated Nov. 2, 2020, 08 pages of Office Action and 09 pages of English Translation.

Office Action for TW Patent Application No. 107100288, dated Mar. 8, 2021, 19 pages of Office Action.

* cited by examiner

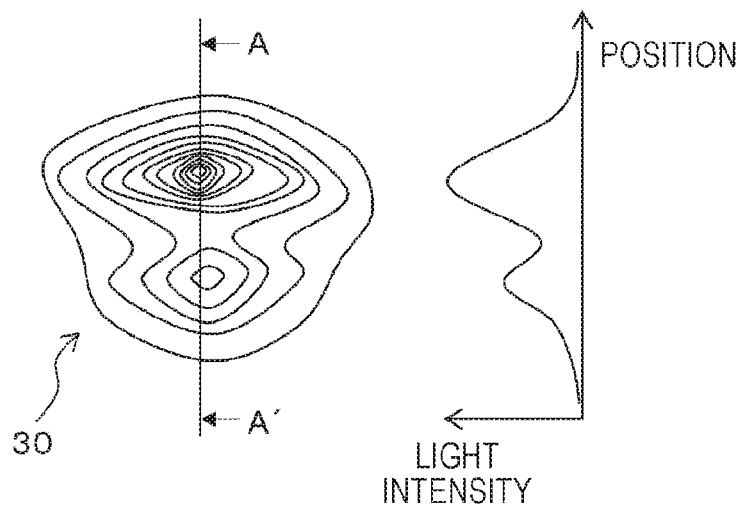
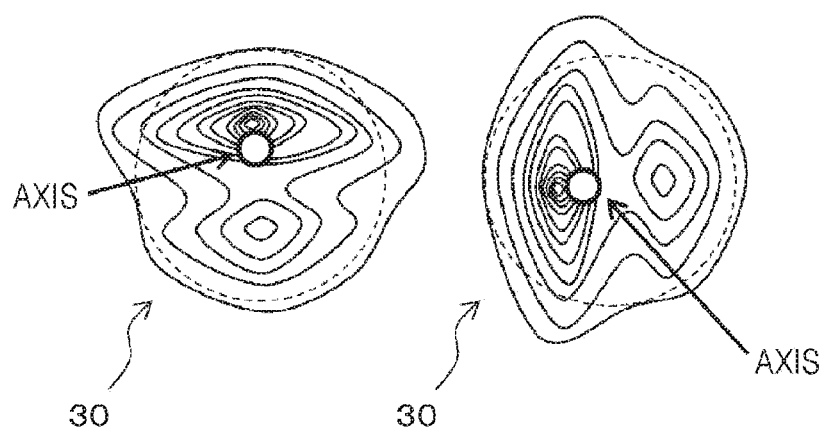

PHOTODETECTION METHOD AND PHOTODETECTION APPARATUS

CROSS REFERENCE TO RELATED APPLICATIONS

This application is a U.S. National Phase of International Patent Application No. PCT/JP2018/000761 filed on Jan. 15, 2018, which claims priority benefit of Japanese Patent Application No. JP 2017-005399 filed in the Japan Patent Office on Jan. 16, 2017. Each of the above-referenced applications is hereby incorporated herein by reference in its entirety.

TECHNICAL FIELD

The present technology relates to a photodetection method, a photodetection apparatus, and a program, and specifically, a photodetection method and the like for stably obtaining an optical axis or a diameter of light of a light beam (including a variety of light beams such as a convergent light beam or a diffused light beam, for example, in addition to collimated light).

BACKGROUND ART

Some of the cases that are determined to be non-conforming in a conventional method for specifying a light beam do not cause any problems, because a required amount of light is satisfied in communication. There is no method for specifying a form of light on a transmission side or on a reception side from the viewpoint of the securing of communication as a transceiving system. There is a standard for specifying light having a light intensity that exhibits a normal distribution, such as "IEC 61280-1-4", but the standard has basically been defined for a single mode that exhibits a normal distribution. It is difficult for a light source that performs surface light emission, such as a vertical cavity surface emitting laser (VCSEL), to perform an output in a uniform light intensity distribution, and "IEC 61280-1-4" is not applicable to such a case.

In connection between a receptacle and a plug of a connector, the most primarily used method is an optical connection method using physical contact by which the cores of fibers are physically and directly connected to each other. In this method, light directly propagates between cores of the receptacle and the plug. Even in a case where a light source having power that does not exhibit a normal distribution is used, light output from a core end surface is normalized when the light passes over a certain distance in a fiber, and therefore a form of light can be specified according to "IEC 61280-1-4".

In an Ethernet system that is leading in optical communication, a large number of active optical cables (AOCs) are used. In this AOC, an optical-to-electrical conversion module is incorporated into a plug, and therefore the plug is connected to a receptacle at an electrical contact, and light only propagates in a cable without any contact with the outside. Thus, a form of light does not need to be clearly specified. Therefore, even in a case where a light source that does not have a uniform power distribution, such as a VCSEL, is used, it is sufficient if communication is secured, and a form of light does not need to be specified.

As described above, there is no need to clearly specify a light beam that does not have a normal distribution, and therefore no standards exist at present. Thus, in a case where there is a connector that has, on an end surface, a form of light by which light does not have a uniform power distribution, some of the cases that are determined to be non-conforming in a conventional method for specifying collimated light do not cause any problems in actual communication. At present, there is no method for specifying an end surface of light on a transmission side and on a reception side from the viewpoint of the securing of communication.

As described above, there are no standards for specifying a light beam having a non-uniform power distribution, but at present, a method for regarding the center of gravity of power as an axial position is generally used as a method for specifying an optical axis. However, the center of gravity is dependent on a state of non-uniformity of an intensity distribution. Therefore, in the case of a light source in which respective optical elements have variations in the intensity distribution, such as a VCSEL, it is difficult to stably control the center of gravity. Furthermore, collimated light emitted from a light source having a non-uniform power distribution has a tendency that a power distribution changes according to a distance from the light source, and the center of gravity deviates at each point. As a result, it is also expected that an optical axis will become unstable. Moreover, in a case where the number of channels increases, the deviation of an axis exists in each channel. Therefore, in a case where an attempt is made to absorb the deviation of the axis by using mechanical tolerance or the like, it is also expected that specifications will become too strict to realize a connector.

The description above is provided with an axis as a reference. However, a result of calculating a diameter of collimated light is similarly unstable, and a method for specifying an X-axis and a Y-axis on a certain cross-section of the collimated light and regarding a width calculated from an intensity distribution on the axes as the diameter of the collimated light is generally used as a method for specifying a diameter of light. Alternatively, a method for specifying an X-axis and a Y-axis with the center of gravity as a middle point and regarding a width calculated from an intensity distribution on the axes as a diameter of collimated light is used. However, if the width is specified by only using X and Y at a certain point, as described above, in a case where an intensity distribution is non-uniform, there is a possibility that a large error will be generated.

For example, Patent Document 1 describes a technology relating to the specification of collimated light of a multi-mode type. This technology is a technology relating to a focus detection method and an apparatus for adjusting convergence/diffusion and axis deviation of a collimator optical system with ease and high accuracy, and even in a case where the power distribution of a light source is non-uniform, the power distribution is regarded as a Gaussian distribution, and a diameter of light and an axis are calculated. However, details of the method above for performing calculation while regarding the power distribution as the Gaussian distribution have not been mentioned, although only a description that "a distribution of an integrated value of pixels is regarded as a Gaussian distribution" is provided. It cannot be said that the method above is a method that enables an optical axis and a diameter of light to be stably calculated.

In a case where there are a large number of vendors such as optical connectors for consumer use, if an attempt is made to realize optical connection by using collimated light, the collimated light needs to be specified, and a method is necessarily required for stably calculating an optical axis or a diameter of light of collimated light emitted from a light source having a non-uniform intensity distribution, such as a VCSEL.

CITATION LIST

Patent Document

Patent Document 1: Japanese Patent Application Laid-Open No. 2001-166202

SUMMARY OF THE INVENTION

Problems to be Solved by the Invention

It is an object of the present technology to stably obtaining an optical axis or a diameter of light of even a light beam having a non-uniform intensity distribution.

Solutions to Problems

A concept of the present technology is a photodetection method including:
a first step of obtaining an outer shape of a range of a light intensity having a specified ratio with respect to a total light intensity on a cross-section of a light beam; and
a second step of obtaining an approximate circle from the outer shape and obtaining an optical axis and/or a diameter of light of the light beam on the basis of the approximate circle.

In the present technology, in the first step, an outer shape of a range of a light intensity having a specified ratio with respect to a total light intensity on a cross-section of a light beam is obtained. For example, the light beam may be collimated light. Furthermore, the light beam may be a multimode laser beam. Furthermore, the light beam may be a laser beam emitted by a VCSEL.

Furthermore, for example, in the first step, the total light intensity may be obtained by adding all of light intensities in a plurality of positions on the cross-section of the light beam, a position may be selected from the plurality of positions in the descending order of the light intensities, a light intensity may be sequentially added, and the outer shape may be obtained on the basis of a plurality of the positions that have been sequentially selected at a time when added light intensities have the specified ratio with respect to the total light intensity. In this case, for example, the plurality of positions on the cross-section of the light beam may be positions of respective pixels of an imaging element that images the cross-section of the light beam.

Furthermore, for example, in the first step, the total light intensity may be obtained by adding all of light intensities in a plurality of positions on the cross-section of the light beam, a position may be selected from the plurality of positions in the ascending order of the light intensities, a light intensity may be sequentially subtracted from the total light intensity, and the outer shape may be obtained on the basis of a plurality of the positions that have been sequentially selected at a time when remaining light intensities have the specified ratio with respect to the total light intensity. In this case, for example, the plurality of positions on the cross-section of the light beam may be positions of respective pixels of an imaging element that images the cross-section of the light beam.

Furthermore, in a second step, an approximate circle is obtained from the outer shape, and an optical axis and/or a diameter of light of the light beam is obtained on the basis of this approximate circle. For example, in the second step, the approximate circle is obtained from the outer shape by using the least-squares method. Then, in this case, a center of the approximate circle is determined to be the optical axis of the light beam, and a diameter of the approximate circle is determined to be the diameter of light of the light beam.

As described above, in the present technology, an outer shape of a range of a light intensity having a specified ratio with respect to a total light intensity on a cross-section of a light beam is obtained, and an optical axis and/or a diameter of light of the light beam is obtained on the basis of an approximate circle obtained from this outer shape. Therefore, an optical axis or a diameter of light of a light beam can be stably obtained.

Furthermore, another concept of the present technology is a photodetection apparatus including:
an imaging element that images a cross-section of a light beam and obtains captured image data; and
a processing unit that processes the captured image data and obtains an optical axis and/or a diameter of light of the light beam,
in which the processing unit obtains an outer shape of a range of a light intensity having a specified ratio with respect to a total light intensity on the cross-section of the light beam, obtains an approximate circle from the outer shape, and obtains the optical axis and/or the diameter of light of the light beam on the basis of the approximate circle.

In the present technology, the imaging element images the cross-section of the light beam, and captured image data is obtained. Then, the captured image data is processed by the processing unit, and an optical axis and/or a diameter of light of the light beam is obtained. In this case, in the processing unit, an outer shape of a range of a light intensity having a specified ratio with respect to a total light intensity on the cross-section of the light beam is obtained, an approximate circle is obtained from this outer shape, and the optical axis and/or the diameter of light of the light beam is obtained on the basis of this approximate circle.

As described above, in the present technology, captured image data obtained by imaging a cross-section of a light beam is processed, an outer shape of a range of a light intensity having a specified ratio with respect to a total light intensity on the cross-section of the light beam is obtained, and an optical axis and/or a diameter of light of the light beam is obtained on the basis of an approximate circle obtained from the outer shape. Therefore, an optical axis or a diameter of light of a light beam can be stably obtained.

Effects of the Invention

According to the present technology, an optical axis or a diameter of light of even a light beam having a non-uniform intensity distribution can be stably obtained. Note that effects described herein are only illustrative and are not restrictive, and additional effects may be exhibited.

BRIEF DESCRIPTION OF DRAWINGS

FIGS. 5A and 5B are diagrams illustrating an example of a light intensity distribution (a power distribution) on a cross-section of collimated light.

FIGS. 6A and 6B are diagrams for describing a case where, in collimated light having a non-uniform light intensity distribution, the position of the center of gravity is determined to be an optical axis.

MODE FOR CARRYING OUT THE INVENTION

A mode for carrying out the invention (hereinafter referred to as an "embodiment") is described below. Note that a description will be provided in the order described below.

1. Embodiment
2. Modified examples

1. EMBODIMENT

[Configuration Example of Photodetection Apparatus]

In the case of a system that performs communication between a receptacle and a plug by using collimated light, it is conceivable that receptacles and plugs of many vendors are connected at random, and therefore standardization on a connector end surface is required.

Figure 1:
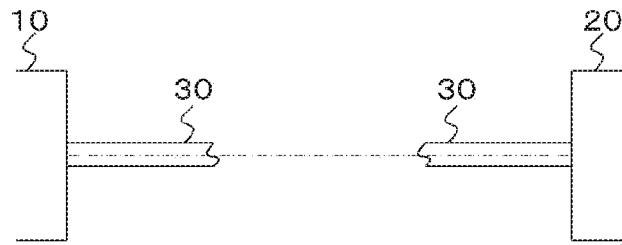
FIG. 1 is a diagram illustrating a manner where communication is performed by using collimated light that is input to or output from end surfaces of a receptacle and a plug.
Figure 2:
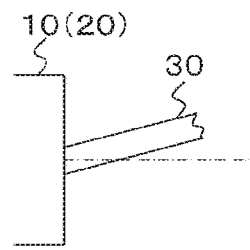
FIG. 2 is a diagram illustrating a state where collimated light that has been output from the end surface of the receptacle or the plug is inclined.
Figure 3:
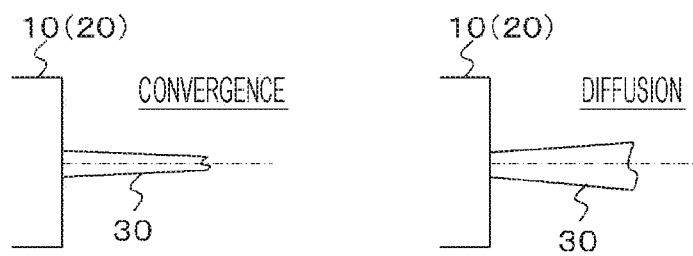
FIG. 3 is a diagram illustrating a state where collimated light that has been output from the end surface of the receptacle or the plug converges or is diffused.

FIG. 1 illustrates a manner where communication is performed by using collimated light 30 that is input to or output from end surfaces of a receptacle 10 and a plug 20. Here, an original purpose of standardization is to eliminate connectors that output collimated light that affects communication due to the inclination of the angle of the collimated light, as illustrated in FIG. 2 or the convergence or diffusion of the collimated light, as illustrated in FIG. 3. However, in a case where an optical axis or a diameter of light fails to be stably calculated for collimated light that can realize communication but that is emitted from a light source having a non-uniform light intensity distribution, such as a VCSEL, it is conceivable that deviation from a specified value unintentionally occurs.

Figure 4:
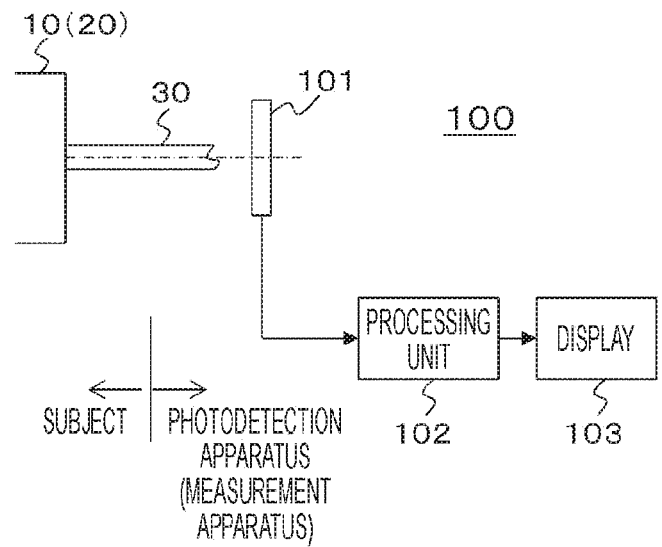
FIG. 4 is a block diagram illustrating a configuration example of a photodetection apparatus serving as a measurement apparatus.

FIG. 4 illustrates a configuration example of a photodetection apparatus 100 serving as a measurement apparatus. This photodetection apparatus 100 includes an imaging element 101 such as a CMOS, a processing unit 102 that is configured by a CPU or the like, and a display 103 that is configured by an LCD or the like. Note that this photodetection apparatus 100 obtains an outer shape of a range of a light intensity having a specified ratio with respect to a total light intensity on a cross-section of a light beam, obtains an approximate circle from the outer shape, obtains an optical axis or a diameter of light of the light beam on the basis of this approximate circle, and displays a result.

Note that, in this embodiment, a description is provided under the assumption that the light beam is the collimated light 30. However, the present technology is not limited to the collimated light 30, and is also applicable to a variety of light beams such as a convergent light beam or a diffused light beam, for example. Furthermore, in this embodiment, the collimated light 30 is assumed to be a multimode laser beam, for example, a laser bean emitted from a multimode light source such as a vertical cavity surface emitting laser (VCSEL). However, the present technology is also applicable to a single-mode laser beam.

The imaging element 101 images a cross-section of the collimated light 30 so as to obtain captured image data. The processing unit 102 processes the captured image data obtained by the imaging element 101, and obtains an optical axis and a diameter of light of the collimated light 30. The display 103 stores, in a not-illustrated memory, a result of calculating the axis and the diameter of light that serve as a processing result of the processing unit 102, and displays the optical axis and the diameter of light.

Details of processing of the processing unit 102 are described. FIG. 5A schematically illustrates an example of a light intensity distribution (a power distribution) on the cross-section of the collimated light 30 by using contour lines. FIG. 5B illustrates a light intensity on line A-A'. In the collimated light 30 having such a light intensity distribution, if the position of the center of gravity is determined to be an optical axis, the position of the optical axis varies depending on the non-uniformity of the light intensity distribution, as illustrated in FIGS. 6A and 6B.

Figure 7A:
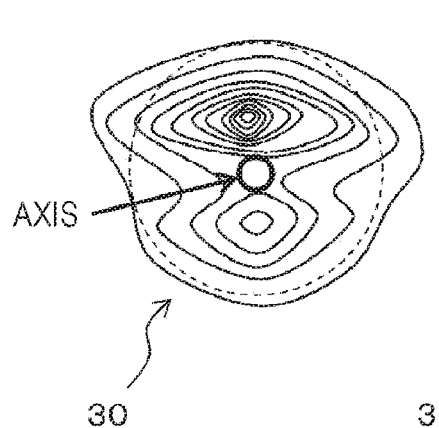
FIGS. 7A and 7B are diagrams for describing a case where, in collimated light having a non-uniform light intensity distribution, a center position is determined to be an optical axis.
Figure 7B:
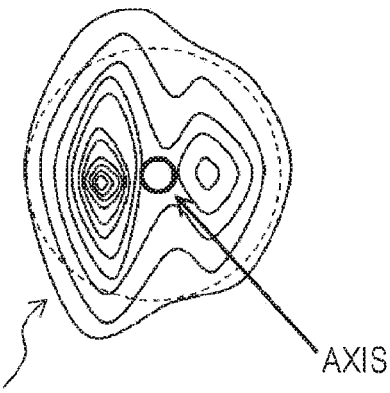

In contrast, in the collimated light 30 having such a light intensity distribution, if a center position is determined to be the optical axis, the position of the optical axis can be stably obtained even in a case where the light intensity distribution has non-uniformity, as illustrated in FIGS. 7A and 7B. However, it is difficult to calculate a center of the collimated light 30 having a non-uniform light intensity distribution, and the calculation has not been mentioned.

The processing unit 102 calculates a position as close to the center as possible as the optical axis for the collimated light 30 having a non-uniform light intensity distribution. In other words, the processing unit 102 obtains an outer shape of a range of a light intensity having a specified ratio with respect to a total light intensity on the cross-section of the collimated light 30, a ratio of 86.5% in this embodiment, obtains an approximate circle from the outer shape, and obtains the optical axis and a diameter of light of the collimated light 30 on the basis of this approximate circle.

Figure 8:
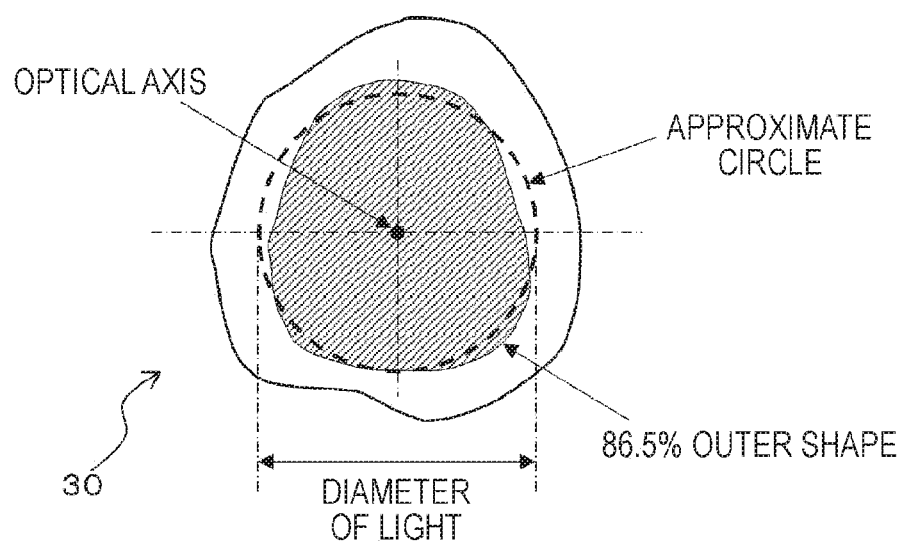
FIG. 8 is a diagram for describing an example of a procedure for obtaining an optical axis and a diameter of light of collimated light.

An example of a procedure for obtaining the optical axis and the diameter of light of the collimated light 30 is described with reference to FIG. 8. In FIG. 8, an outside solid line indicates an outer shape of the cross-section of the collimated light 30, namely, a boundary between a light intensity of 0 and a light intensity that is larger than 0.

(1) First, the processing unit 102 adds all of the light intensities in a plurality of positions on the cross-section of the collimated light 30 so as to obtain a total light intensity. In this embodiment, the processing unit 102 processes captured image data, and the plurality of positions on the cross-section of the collimated light 30 are the positions of respective pixels of the imaging element 101 that images the cross-section of the collimated light 30. In this case, the total light intensity is obtained by adding all of the levels of signals (light intensities) in the positions of the respective pixels of the captured image data.

(2) Next, the processing unit 102 selects a position from the plurality of positions in the descending order of the light intensities, sequentially adds the light intensity, and obtains an outer shape of a range of a light intensity having a specified ratio with respect to the total light intensity on the cross-section of the collimated light 30 on the basis of a plurality of positions that have been sequentially selected at a time when the added light intensities has the specified ratio (86.5%) with respect to the total light intensity. In FIG. 8, the range of the light intensity having the specified ratio with respect to the total light intensity on the cross-section of the collimated light 30 is illustrated by hatching.

(3) Next, the processing unit 102 obtains an approximate circle from the outer shape obtained in (2). In this case, the processing unit 102 calculates the approximate circle by using the least-squares method. In FIG. 8, the approximate circle is illustrated with a broken line.

(4) Then, the processing unit 102 determines the center of the approximate circle obtained in (3) to be the optical axis of the collimated light 30, and determines a diameter of the approximate circle to be the diameter of light of the collimated light 30, as illustrated in FIG. 8

Figure 9:
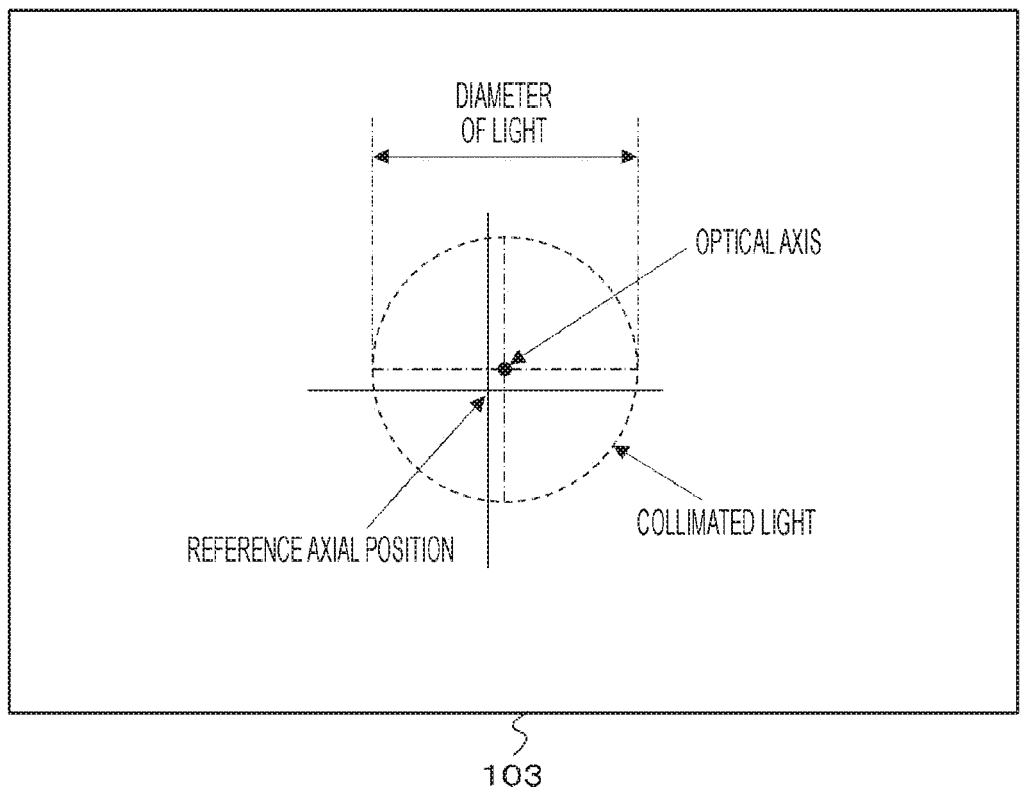
FIG. 9 is a diagram illustrating a display example of an optical axis and a diameter of light on a display.

FIG. 9 illustrates a display example of the display 103. The collimated light 30 is indicated by the approximate circle. Then, in this case, a display is conducted in such a way that a degree of deviation of the obtained optical axis of the collimated light 30 from a reference axial position on a standard and a direction of the deviation can be understood.

As described above, the photodetection apparatus 100 illustrated in FIG. 4 obtains an outer shape of a range of a light intensity having a specified ratio with respect to a total light intensity on the cross-section of the collimated light 30, and obtains the optical axis and the diameter of light of the collimated light 30 on the basis of an approximate circle obtained from the outer shape. Therefore, there is little influence of the non-uniformity of a light intensity distribution at a pinpoint, and the optical axis and the diameter of light of the collimated light 30 can be stably obtained.

2. MODIFIED EXAMPLES

Note that in the embodiment described above, the specified ratio is assumed to be 86.5%. This ratio of 86.5% is a numerical value that is also described in "ISO 11145", but the present technology is applicable to an arbitrary numerical value.

Furthermore, in the embodiment described above, a method has been described in which, in obtaining an outer shape of a range of a light intensity having a specified ratio with respect to a total light intensity on the cross-section of the collimated light 30, a position is selected from a plurality of positions in the descending order of a light intensity and the light intensity is sequentially added. However, a method is also conceivable in which, in obtaining an outer shape of a range of a light intensity having a specified ratio with respect to a total light intensity on the cross-section of the collimated light 30, a position is selected from a plurality of positions in the ascending order of a light intensity and the light intensity is sequentially subtracted.

In this case, the processing unit 102 selects a position from a plurality of positions in the ascending order of a light intensity, sequentially subtracts the light intensity from a total light intensity, and obtains an outer shape of a range of a light intensity having a specified ratio with respect to the total light intensity on the cross-section of the collimated light 30 on the basis of a plurality of positions that have been sequentially selected at a time when remaining light intensities has the specified ratio with respect to the total light intensity.

Note that a method for obtaining the outer shape by performing sequential addition or sequential subtraction, as described above, is not restrictive, and it is sufficient if an outer shape having a specified ratio can be discovered. For example, a total addition value of light intensities in a sectioned area that is determined in advance may have a specified ratio with respect to a total light intensity.

Furthermore, in the embodiment described above, it is assumed that a light beam is collimated light that has a non-uniform light intensity distribution, but the present technology is also applicable to collimated light that has an exact Gaussian distribution.

Furthermore, in the embodiment described above, it is assumed that a light beam having a non-uniform light intensity distribution is a laser beam that is generated by a VCSEL, but the present technology is also applicable to another laser beam having a non-uniform light intensity distribution.

Furthermore, in the embodiment described above, a description has been provided under the assumption of one channel, but the present technology is also applicable to a multichannel case. In this case, a total light intensity is obtained for each of the channels, and the present technology needs to be applied to each of the channels.

Furthermore, in the embodiment described above (see FIG. 4), a case has been described where an optical axis of the collimated light 30 that is output from an end surface of the receptacle 10 or the plug 20 is perpendicular to the end surface. However, the present technology is also applicable to a case where the optical axis of the collimated light 30 that is output from the end surface of the receptacle 10 or the plug 20 is not perpendicular to the end surface, as illustrated in FIG. 2, for example.

Figure 10A:
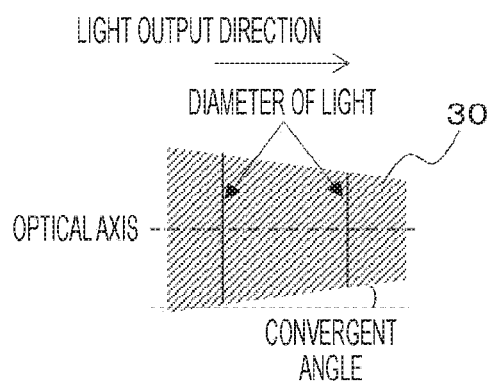
FIGS. 10A and 10B are diagrams for describing that an inclination of an optical axis and a degree of convergence/diffusion of collimated light can be seen by calculating the optical axis and a diameter of light on two or more cross-sections.
Figure 10B:
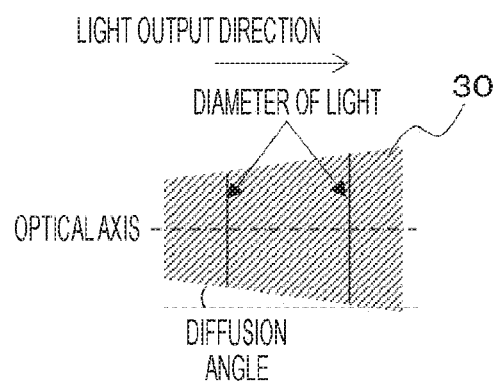

Furthermore, as illustrated in FIGS. 10A and 10B, an inclination of an optical axis and a degree of convergence/diffusion of the collimated light 30 can be seen by calculating an optical axis and a diameter of light on two or more cross-sections of the collimated light 30, but this is not described above.

Note that the configuration described below also falls under a technical scope of the present disclosure.

(1) A photodetection method including:

a first step of obtaining an outer shape of a range of a light intensity having a specified ratio with respect to a total light intensity on a cross-section of a light beam; and a second step of obtaining an approximate circle from the outer shape and obtaining an optical axis and/or a diameter of light of the light beam on the basis of the approximate circle.

(2) The photodetection method described in (1) described above, in which, in the first step, the total light intensity is obtained by adding all of light intensities in a plurality of positions on the cross-section of the light beam, and a position is selected from the plurality of positions in a descending order of the light intensities, a light intensity is sequentially added, and the outer shape is obtained on a basis of a plurality of the positions that have been sequentially selected at a time when added light intensities have the specified ratio with respect to the total light intensity.

(3) The photodetection method described in (2) described above, in which the plurality of positions on the cross-section of the light beam include positions of respective pixels of an imaging element that images the cross-section of the light beam.

(4) The photodetection method described in (1) described above, in which, in the first step, the total light intensity is obtained by adding all of light intensities in a plurality of positions on the cross-section of the light beam, and a position is selected from the plurality of positions in an ascending order of the light intensities, a light intensity is sequentially subtracted from the total light intensity, and the outer shape is obtained on a basis of a plurality of the positions that have been sequentially selected at a time when remaining light intensities have the specified ratio with respect to the total light intensity.

(5) The photodetection method described in (4) described above, in which the plurality of positions on the cross-section of the light beam include positions of respective pixels of an imaging element that images the cross-section of the light beam.

(6) The photodetection method described in any of (1) to (5) described above, in which the light beam includes collimated light.

(7) The photodetection method described in any of (1) to (6) described above, in which, in the second step, the approximate circle is obtained from the outer shape by using a least-squares method.

(8) The photodetection method described in any of (1) to (7) described above, in which the light beam includes a multimode laser beam.

(9) The photodetection method described in (1) described above, in which the light beam includes a laser beam that is emitted from a vertical cavity surface emitting laser.

(10) A photodetection apparatus including:

an imaging element that images a cross-section of a light beam and obtains captured image data; and a processing unit that processes the captured image data and obtains an optical axis and/or a diameter of light of the light beam, in which the processing unit obtains an outer shape of a range of a light intensity having a specified ratio with respect to a total light intensity on the cross-section of the light beam, obtains an approximate circle from the outer shape, and obtains the optical axis and/or the diameter of light of the light beam on the basis of the approximate circle.

(11) A program for causing a computer to perform a photodetection method including:

a first step of obtaining an outer shape of a range of a light intensity having a specified ratio with respect to a total light intensity on a cross-section of a light beam; and a second step of obtaining an approximate circle from the outer shape and obtaining an optical axis and/or a diameter of light of the light beam on the basis of the approximate circle.

REFERENCE SIGNS LIST

10 Receptacle
20 Plug
30 Collimated light
100 Photodetection apparatus
101 Imaging element
102 Processing unit
103 Display

The invention claimed is:

1. A photodetection method, comprising:
in a photodetection apparatus:
obtaining image data of a cross-section of a light beam;
obtaining a total light intensity by adding all light intensities in a plurality of positions on the cross-section of the light beam, wherein the plurality of positions is associated with the obtained image data;
sequentially selecting a set of positions from the plurality of positions in a descending order of the light intensities;
sequentially adding the light intensities associated with the selected set of positions, wherein the set of positions is sequentially selected from the plurality of positions until the sequentially added light intensities has a specific ratio with respect to the total light intensity;
obtaining an outer shape of a range of the sequentially added light intensities on the cross-section of the light beam;
obtaining an approximate circle from the outer shape; and
obtaining at least one of an optical axis or a diameter of light of the light beam based on the approximate circle.

2. The photodetection method according to claim 1, further comprising imaging, by an imaging element of the photodetection apparatus, the cross-section of the light beam to obtain the image data of the cross-section of the light beam, wherein the plurality of positions on the cross-section of the light beam include positions of respective pixels of the obtained image data.

3. The photodetection method according to claim 1, wherein the light beam includes collimated light.

4. The photodetection method according to claim 1, further comprising obtaining the approximate circle based on a least-squares method.

5. The photodetection method according to claim 1, wherein the light beam includes a multimode laser beam.

6. The photodetection method according to claim 1, wherein the light beam includes a laser beam that is emitted from a vertical cavity surface emitting laser.

7. A photodetection apparatus, comprising:
an imaging element configured to:
image a cross-section of a light beam; and
obtain captured image data based on the imaging of the cross-section; and
a central processing unit (CPU)
configured to:
obtaining a total light intensity by adding all of light intensities in a plurality of positions on the cross-section of the light beam, wherein the plurality of positions is associated with the obtained image data;
sequentially select a set of positions from the plurality of positions in a descending order of the light intensities;
sequentially add the light intensities associated with the selected set of positions, wherein the set of positions is sequentially selected from the plurality of positions until the sequentially added light intensities has a specific ratio with respect to the total light intensity;
obtain an outer shape of a range of the sequentially added light intensities on the cross-section of the light beam;
obtain an approximate circle from the outer shape; and
obtain at least one of an optical axis or a diameter of light of the light beam based on the approximate circle.

8. A non-transitory computer-readable medium, having stored thereon computer-executable instructions that, when executed by a processor, cause a computer to execute instruction operation, the operation comprising:
  obtaining image data of a cross-section of a light beam;
  obtaining a total light intensity by adding all of light intensities in a plurality of positions on the cross-section of the light beam, wherein the plurality of positions is associated with the obtained image data;
  sequentially selecting a set of positions from the plurality of positions in a descending order of the light intensities;
  sequentially adding the light intensities associated with the selected set of positions, wherein the set of positions is sequentially selected from the plurality of positions until the sequentially added light intensities has a specific ratio with respect to the total light intensity;
  obtaining an outer shape of a range of the sequentially added light intensities on the cross-section of the light beam;
  obtaining an approximate circle from the outer shape; and
  obtaining at least one of an optical axis or a diameter of light of the light beam based on the approximate circle.

9. A photodetection method, comprising:
  in a photodetection apparatus:
  obtaining image data of a cross-section of a light beam;
  obtaining a total light intensity by adding all of light intensities in a plurality of positions on the cross-section of the light beam, wherein the plurality of positions is associated with the obtained image data;
  sequentially selecting a set of positions from the plurality of positions in an ascending order of the light intensities;
  sequentially subtracting the light intensities associated with the selected set of positions from the total light intensity, wherein the set of positions is sequentially selected from the plurality of positions until subtracted total light intensity has a specific ratio with respect to the total light intensity;
  obtaining an outer shape of a range of the subtracted total light intensity on the cross-section of the light beam;
  obtaining an approximate circle from the outer shape; and
  obtaining at least one of an optical axis or a diameter of light of the light beam based on the approximate circle.

10. The Photodetection method according to claim 9, further comprising
  imaging, by an imaging element of the photodetection apparatus, the cross-section of the light beam to obtain the image data of the cross-section of the light beam, wherein the plurality of positions on the cross-section of the light beam include positions of respective pixels of the obtained image data.

* * * * *